United States Patent [19]
Field

[11] 3,858,989
[45] Jan. 7, 1975

[54] JOINT FOR CONNECTING MEMBERS

[76] Inventor: Frank P. Field, 122 Eucalyptus Dr., El Segundo, Calif. 90245

[22] Filed: Sept. 10, 1973

[21] Appl. No.: 395,558

[52] U.S. Cl................. 403/171, 403/295, 403/362
[51] Int. Cl. ........................ F16b 7/00, F16b 35/00
[58] Field of Search .......... 403/171, 176, 170, 217, 403/295, 172, 173, 174, 175, 177, 178, 362, 252, 255

[56] References Cited
UNITED STATES PATENTS

| | | | |
|---|---|---|---|
| 2,931,129 | 4/1960 | Boniface | 403/171 |
| 3,458,052 | 7/1969 | Kann | 403/255 |
| 3,472,539 | 10/1969 | Fenwick | 403/171 |
| 3,532,369 | 10/1970 | Reilly | 403/176 |
| 3,537,736 | 11/1970 | Kroopp | 403/171 |
| 3,580,620 | 5/1971 | Offenbroich | 403/252 |

*Primary Examiner*—Werner H. Schroeder
*Attorney, Agent, or Firm*—Burns, Doane, Swecker & Mathis

[57] ABSTRACT

A joint for connecting structural members cammingly locks together a female structural member and a male structural member inserted therein upon engagement of a portion of the female member by a setscrew disposed in the male member. The engagement occurs upon movement of the setscrew outwardly from the longitudinal axis of the male member.

11 Claims, 7 Drawing Figures

PATENTED JAN 7 1975 3,858,989

JOINT FOR CONNECTING MEMBERS

BACKGROUND OF THE INVENTION

This invention relates generally to a joint for connecting and locking members together. More specifically, the invention relates to a rigid, structural joint wherein a female member is cammed against and locked with a male member inserted therein to minimize rotational, longitudinal, and transverse movement of the members relative to one another by means of an unexposed and outwardly moveable setscrew.

Connectors of the class of rigid, structural joints may enjoy a broad spectrum of applicability which may ranage from the connection of simple links to the construction of complex three dimensional frames. A particularly significant application of such joints is found in display or storage frames used in many retail businesses. In addition, such joints may be utilized in playground structures upon which children may climb or otherwise play. Such joints may also find application in many different items of furniture. With regard to these and other applications, the joints of the prior art entail a number of problems, such as those discussed below, which have not been dealt with or which have not been dealt with effectively.

Many joints appearing in the prior art may fail to provide a sufficiently rigid connection between the members being joined. These joints may not adequately resist rotational, longitudinal, and transverse movement between the members being joined, and the structure formed thereby may not be sufficiently secure for its intended purpose.

Those joints disclosed in the prior art which do deal with this problem of structural inadequacy often encounter further difficulty due to the characteristic complexity of the mechanisms employed to lock together the members being joined. Clearly, the more parts involved in a joint and the more complicated the interaction of these parts, the less dependable and more vulnerable to failure and wear the joint becomes. Furthermore, complicated joints may require lubrication, may be difficult to fabricate, and may be inconvenient to use.

Somewhat related to the problem just discussed is that of wear of the joint incident to repeated assembly and disassembly. Gradual wear and loosening of a joint may be inevitable in many joints of the prior art and may ultimately lead to serious structural inadequacy. Such wear may be a particularly significant problem if a joint were comprised of numerous parts or lacked the capability of easy compensation for such wear. Clearly, it would be advantageous if a simple joint capable of automatically compensating for wear could be provided.

Other joints of the prior art which deal with the problem of structural inadequacy encounter difficulty due to the exposed nature of the mechanisms locking together the members being joined. Joints having exposed locking mechanisms may be vulnerable to vandalism and may tend to catch or snag clothing, fabrics, or other objects which may come into contact with the joint.

Whereas structures employing joints which are broadly of the same type as this invention may be adequate for resisting conventional static loads, another difficulty may arise if such structures are cyclically loaded, as is often the case. Cyclic loading, that is repetitive loading and unloading, of these joints may result in loosening and movement of the members joined, particularly along the longitudinal axes thereof, if the joints are locked by frictional forces or are otherwise inadequately secured.

A further problem arises due to the fact that in any structure, it is quite important that there exist as few residual stresses or stress concentrations as possible prior to the loading of the structure. Such residual stresses or stress concentrations reduce the supportive capacity of a structure at the point where each stress occurs and consequently, may weaken the structure as a whole. This is particularly true with regard to stress concentrations which might develop at the reentrant, or intersecting, flexural surfaces such as appear in a number of joints of the prior art. Such a concentration of stresses can cause yielding in the area of the concentration which can grow until the member fractures or collapses. This phenomenon may be particularly significant in some joints of the prior art used in applications where stresses due to loading alone can be quite high.

Another problem in many retail businesses and in some playground areas is vandalism. This problem has existed in the prior art as a result of the difficulty of rendering a structure, and more particularly a joint, secure against vandalism while simultaneously maintaining the structural integrity of the joint without introducing undesirable complexity.

An added, special problem has developed with the advent of double knit fabrics and clothing, particularly the clothes of the polyester, double knit type. Double knit fabrics and clothing are particularly susceptible to snagging and pulling with consequent spoiling of the appearance and saleability of these goods. Thus, considering the need to protect such fabrics when displayed on or otherwise in contact with a frame employing joints of the present type, and the co-extensive desirablity of protecting the hands and body of children who might play on playground equipment utilizing structural joints broadly similar in type to this invention, it would be advantageous to provide a joint free from surfaces, edges, or corners which may be likely to snag or pull objects which might contact the joint. It would be also advantageous if a joint could be provided which would conceal essentially all the edges or corners of the locking mechanism of the joint without rendering locking of the members difficult to accomplish or structurally inadequate.

Many joints disclosed in the prior art require a degree of mechanical skill to use the joint. Others may require more than one person to efficiently assemble a structure. It would therefore be desirable to provide a joint which would, by virtue of its mode and manner of locking members together, permit the use of the joint by a person having less than exceptional dexterity in constructing a structure in a relatively short amount of time and with a relatively small expenditure of effort.

It will be noted that the problems discussed above may add to the cost of fabricating or using a joint subject to any or all of these difficulties. Thus, if a joint could be provided that would obviate or minimizing these problems without increasing the cost of fabrication or use of the joint, the desirability of such a joint would be further enhanced.

An Offenbroich U.S. Pat. No. 3,580,620 is illustrative of certain of the problems discussed above. This patent discloses a device which transversely secures a first tube to a second tube by the reaction of an inwardly threaded setscrew against an expansible insert within the first tube. The Offenbroich device axially appears to secure the first tube to the second tube by the reaction of a conical head of the setscrew against an inclined surface located on the male member suspended from a slot in a lateral surface of the second tube and inserted through the expansible insert.

Consequently, this joint appears to secure the first tube to the lateral surface of the second tube by the axial displacement and clamping of the male member protruding from the lateral surface of the second tube and the transverse expansion of the insert within the first tube. Aside from the relative complexity involved in this five-piece construction, the effectiveness of the clamping together of the tubes may be limited where the expansible insert is not first firmly anchored to the interior of the first tube. Thus, with regard to tight abutment of the tubes, clamping may be rendered ineffective by reason of movement of the insert relative to the first tube.

It will be further noted that the thin rectangular character of the male member where suspended from the slot in the second member may render it capable of only limited torsional resistance. Thus, while the Offenbroich joint may secure members together against relative movement in a longitudinal and transverse sense, it may not successfully resist rotational displacement.

Furthermore, this joint may be vulnerable to movement of the first member relative to the second member along the longitudinal axis of the first member upon cyclic loading of the structure of which the two members are a part.

Also, the setscrew employed to affect the clamping may not be sufficiently concealed to preclude any snagging of any garments or other objects which might contact the joint in this area.

Finally, the clamping of the first member in directions parallel and transverse to the longitudinal axis thereof may render it difficult for a person having less than exceptional dexterity to easily erect a structure using this joint.

A U.S. Pat. No. 645,977, issued to Shields, discloses a device which while not subject to relative movement under cyclic loading or difficulty in assembly, and while avoiding residual stresses, still appears to involve many of the problems discussed earlier. The disclosed device provides a conical socket or female member into which a conical male member is inserted and cammingly locked by a conically headed, inwardly threading screw disposed in the female member.

Disposed on the exterior of the female member and adapted for manipulation by hand, this arrangement may be quite susceptible to vandalism. Furthermore, the disposition of the screw in the thinly walled female member appears to require reinforcement of the female member in the form of a rather large, protruding structure which may catch or snag objects contacting the joint. Finally, the prominence of the screw disposed in this manner, may render the screw rather vulnerable to fracture.

OBJECTS AND SUMMARY OF THE PREFERRED FORMS OF THE INVENTION

In light of the foregoing, it is therefore a general object of the invention to provide a joint for connecting members intended to obviate or minimize the problems of the type previously noted.

It is a particular object of the invention to provide a novel joint for connecting members wherein the members may be locked against rotational, longitudinal and transverse movement relative to one another by means of a very simple and unexposed locking assembly.

It is another object of the invention to provide a novel joint for connecting members which has very few parts and which is capable of compensating for wear.

It is another object of the invention to provide a novel joint for connecting members which is capable of resisting, under cyclic loading, any loosening or movement relative to one another of the members being joined.

It is still a further object of the invention to provide a novel joint for connecting members which is substantially free from residual stresses or stress concentrations which may reduce the structural capacity of the joint.

It is likewise an object of the invention to provide a novel joint for connecting members which by its mode and manner of locking may render the joint relatively secure against vandalism.

It is also an object of the invention to provide a novel joint for connecting members in which protruding or otherwise irregular structural surfaces which may snag or catch clothes, fabrics, or other objects contacting the joint are substantially eliminated.

It is yet another object of the invention to provide a novel joint for connecting members by means of which a structure can be easily and efficiently constructed by a person having less than exceptional dexterity.

A joint for connecting members according to a preferred embodiment of the invention intended to accomplish at least some of the foregoing objects includes a hub member essentially polyhedral in shape from which radiate cruciform and cylindrical male portions each having a setscrew, or other similarly functioning engagement or eccentric locking means, and under usual operable circumstances, continuously disposed therein. Each male portion is adapted for operable insertion into an elongated female member and radiates from an abutment surface of the hub member against which the receiving end of that female member abuts.

The male portions in general may be reinforced adjacent the hub member by appropriate fillets. Especially in the case of a cylindrical male member, these fillets may be received in the interior of a female member and may thereby serve to facilitate rotational orientation of the female member relative to the male member. In the cruciform male members, however, such fillets serve primarily a reinforcing function and the rotational orientation function is primarily facilitated by lateral, planar surfaces extending parallel to the longitudinal axis of each male member and forming the radially outermost ends of the legs of the cruciform. These lateral surfaces snugly contact the interior of a female member upon insertion of the male member within the elongated female member.

The setscrew carried by the male portions is adapted for outward manipulation by a conventional tool such as an allen wrench or a screwdriver. An end of each setscrew serves an engagement or cam function with respect to the female member and in this regard is preferably of a generally conical shape. By virture of this engagement and camming function the elongated female member is cammed toward and ultimately locked against the abutment surface on the hub member.

It is quite important to note that in the course of the engagement and camming function, the setscrew remains continuously within the ambit of an outer surface of the surrounding female member. It is also noteworthy that removal of a setscrew from a male portion requires complete disassembly of the joint. Furthermore, the camming nature of the engagement provides automatic compensation for any wear which may take place in the locking mechanism of the present invention.

The tool mentioned above is insertable through an access opening disposed in the female member to allow manipulation of the setscrew. This access opening situated a longitudinal distance, measured from the receiving end of the female member abutting the hub member, slightly greater than the distance from the hub member to the setscrew. That is to say, upon threading of the setscrew outwardly from the longitudinal axis of the male portion by rotation of the tool, the offset distance described above, between the setscrew and the access opening causes the setscrew to engage an internal edge portion of the peripheral wall bounding the access opening, most proximal to the end of the tube abutting the hub member to cam and lock the female member to the abutment surface. This mode of engagement and locking conceals the locking mechanism and, thus, the locking mechanism is not subject to problems of snagging or vandalism. The outward movement of the setscrew to cam the female member against the abutment surface also provides transverse clamping of the female member against one of the lateral surfaces of the male portion. This transverse clamping, in conjunction with the alignment function mentioned earlier, is effective in resisting the loosening and movement often occurring as a result of cyclic loading. Such camming and transverse clamping further insures a structurally sound joint and very snug abutment of the female members with the surfaces of the hub member.

The exposed surfaces, edges, and corners of the hub member and the female member may be rounded and shaped to avoid catching or snagging objects which may contact the joint. The male portions may include at least one member which is generally cylindrical and hollow throughout its length. The interior of the hub member may also be hollow and coextensive with the interior of that cylindrical male member to facilitate proper cooling of the joint when it is cast. Other male portions may be cruciform in transverse section.

THE DRAWINGS

Other objects and advantages of the present invention will become apparent with reference to the detailed description to follow of a preferred embodiment thereof wherein like reference numerals have been applied to like elements in which.

DETAILED DESCRIPTION

Figure 1:
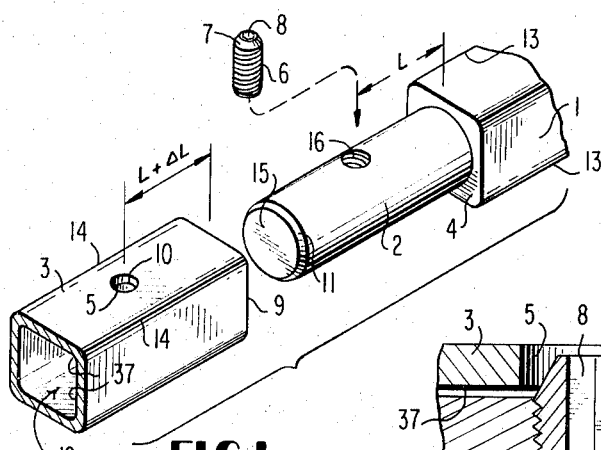
FIG. 1 is an exploded, perspective view of an embodiment of the invention showing male, female, and hub members and a setscrew employed in locking together members of an assembled joint according to the present invention.

Referring to FIG. 1 of the drawings, one embodiment of the invention can be seen to be comprised of a member or hub 1 of generally prismatic configuration and further characterized by a male portion or insert 2 which is adapted for insertion into an elongated female member 3.

The hub 1 and the female member 3 axially abut at an abutment surface 4 and at this junction coincide very closely in shape and dimension. This abutment surface 4 serves to axially locate an access opening 5 in the female member 3 relative to a setscrew 6 or other similarly functioning engagement or eccentric locking means which is operably disposed in the insert 2. The abutment surface 4 also cooperates to provide a smooth intersection between the hub 1 and the female member 3 to minimize the exposure of any sharp edges and to facilitate a snug axial relation between the hub 1 and the female member 3 as indicated at 20 in FIG. 2.

The setscrew 6 is characterized by a generally conical camming surface 7 carried by an upper portion of the setscrew 6. Though it should be appreciated that a variety of setscrews may be used in the practice of this invention, the particular type employed in this embodiment has a socket 8 into which a tool such as an allen wrench may be inserted for the purpose of manipulating the setscrew 6.

The center of the access opening 5 is located a distance $L + \Delta L$ from the end 9 of the female member 3 which abuts the hub 1. The longitudinal axis of the setscrew 6 is located a distance $L$ from the abutment surface 4. Thus, it is apparent that the center of the access opening 5 is offset a distance $\Delta L$ farther from the abutting end 9 than is the longitudinal axis of the setscrew 6 from the abutment surface 4. This offset allows the conical surface 7 of the setscrew to cammingly engage an inner edge portion 10 of the peripheral wall bounding the access opening 5 (see FIG. 2). Once the insert 2 and the fully received setscrew 6 are inserted within the female member 3, the setscrew 6 is manipulated outwardly from the longitudinal axis of the insert or male portion 2 to cammingly engage the female member 3. This engagement locks the insert 2 and the female member 3 rigidly together. It will also be appreciated that such camming engagement by a conical surface 7 automatically compensates for wear occurring in the joint.

Figure 2:
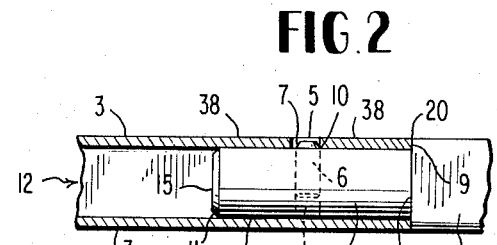
FIG. 2 is a sectional view taken along line 2—2 of FIG. 1, showing the relationship of elements of the invention in an assembled and locked condition.
Figure 3:
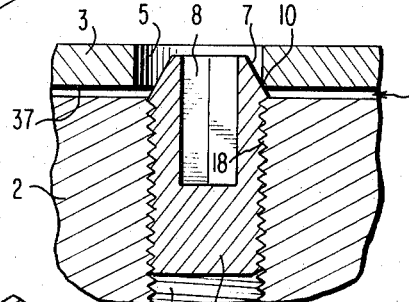
FIG. 3 is an enlargement of a portion of FIG. 2 detailing the mechanism employed to cam and lock the male and female members together.

The insert 2 shown in FIGS. 1–3 is of a simple, cylindrical configuration having a chamfered edge 11 at an end 15 to facilitate reception of the male member within the interior 12 of the female member. The polyhedral hub is of a simple, hexahedral form having rounded edges 13, the configuration of which, as mentioned above, coincides generally with the exterior dimensions of the female member 3 and the rounded edges 14 thereof.

FIG. 2 illustrates a sectional view taken along the line 2—2 of the joint of FIG. 1. As shown, the joint is assembled and locked. The insert 2 of the hub 1 has been inserted into the interior 12 of the female member 3, until the abutting end 9 of the female member 3 abuts the abutment surface 4 of the hub 1. The chamfered edge 11 facilitates smooth insertion of the insert 2 into the interior 12 of the female member 3, unhindered by small interior obstructions.

The joint being in a locked condition, the setscrew 6, in its engaged position, is shown disposed in the threaded aperture 16 of the insert 2. The conical surface 7 of the setscrew 6 cammingly engages the inner edge portion 10 of the peripheral wall bounding the access opening 5 which is most proximal to the hub 1. Such an arrangement cams the female member 3 against the abutment surface 4 to thereby axially lock the female member to the male portion or insert 2. As will be seen in the discussion of FIG. 3, the setscrew also transversely locks together the members being joined by the exertion of clamping forces parallel to the longitudinal axes of the setscrew 6. As indicated earlier, the use of a conical surface 7 also facilitates automatic compensation for wear in the joint as the female member is engaged.

It will be noted that the setscrew 6 in this engaged position is continuously disposed within the ambit or boundary limits of an outer surface 38 of the female member. Such a disposition renders vandalism relatively difficult and makes the setscrew essentially incapable of snagging objects contacting the joint in the area of the access opening 5.

FIG. 3 illustrates an enlarged axial section of the setscrew and associated locking structure illustrated in less detail in FIG. 2. The assembly is shown in a locked condition. As shown, the setscrew 6 is disposed in the threaded aperture 16 intended to receive the setscrew 6. So disposed, the conical surface 7 of the setscrew 6 cammingly engages an inner edge portion 10 of the peripheral wall bounding the access opening 5 of the female member 3 through which the setscrew 6 is reached and manipulated by a tool inserted into the socket 8.

The setscrew 6 preferably does not project beyond the outer surface of the female member when the joint is in the locked condition. This concealment renders the joint relatively invulnerable to vandalism and avoids any projection which might catch or snag objects contacting the joint.

The reaction created by the outward manipulation of the setscrew 6 may cause a very slight displacement of the insert 2 parallel to the longitudinal axis of the setscrew 6 and relative to the female member 3. This displacement may cause a slight widening of a very small space 17 between the insert 2 and the female member 3. As a consequence, the small clearance previously existing in the longitudinally extending zone indicated at 19 in FIG. 2 is eliminated and the insert 2 is tightly clamped against a portion of one of the interior surfaces 37 of the female member 3 (see FIGS. 1 and 2).

As indicated in the discussion of FIG. 2, the camming engagement of the conical surface 7 also exerts an axial clamping force parallel to the longitudinal axis of the insert 2 which forces, as illustrated in FIG. 2, the abutting end 9 of the female member 3 into tight abutment with the abutment surface 4 of the hub 1. This axial clamping is exerted in addition to the transverse clamping just described. This combined axial and transverse clamping geometry insures that the joint is rigidly locked in a very sound structural arrangement capable of resisting not only the usual static loads but cyclic loads as well.

Figures 4, 5, 6, 7:
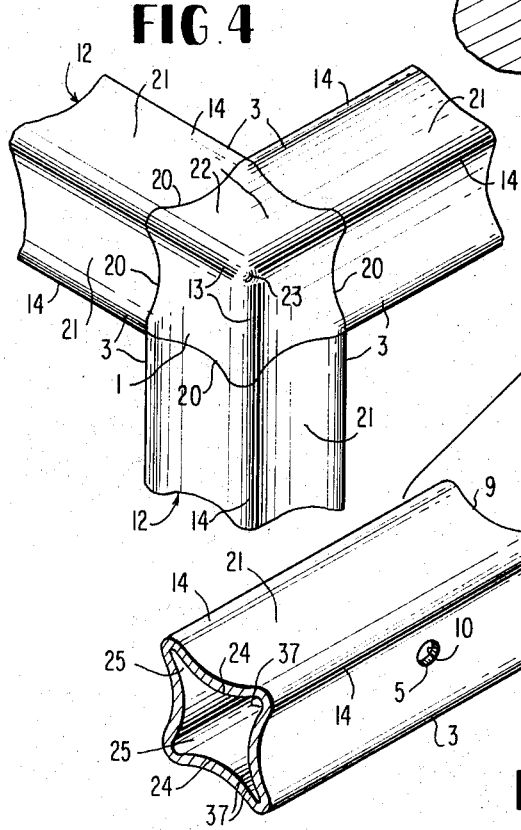
FIG. 4 is a perspective view showing the assembled relation between the hub and female members of a second embodiment of the invention shown in FIGS. 1–3.
FIG. 5 is an exploded, inverted, perspective view of the second embodiment shown in FIG. 4 showing a hub member, male members and one female member, two of the three female members shown in FIG. 4 having been deleted for simplicity.
FIG. 6 is a transverse sectional view of the joint taken along line 6—6 of the embodiment shown in FIG. 5 showing a cylindrical male member assembled with a female member.
FIG. 7 is a transverse sectional view taken along line 7—7 of the embodiment shown in FIG. 5 of a cruciform male member assembled with a female member.

A perspective view of a second embodiment of the invention shown in an assembled and locked condition is ilustrated in FIG. 4. When this embodiment is assembled and locked as shown, the abutting surfaces 9 and 4, corresponding to those illustrated in FIG. 2, meet and form an essentially smooth, continuous intersection 20 between smoothly coextensive, concave surfaces 21 and 22, and between rounded, coextensive, convex edges 14. These rounded, convex edges also intersect as indicated at 23 and these intersections may also be rounded when necessary to avoid any sharp corners.

It can be seen from the smooth and coextensive surfaces that such a joint involves a minimum of either sharp edges or corners and this reduces the resultant tendency of such edges or corners to catch or snag objects contacting these surfaces. It is also apparent that the female members 3 and the hub 1 can be configured in any of a number of shapes which would accomplish the objectives just mentioned. For example, the female members 3 might take a cylindrical form while the hub 1 might be spherical in form. The intersection of the spherical hub and the cylindrical female members would avoid any of the sharp edges or corners which might tend to injure persons or goods coming in contact with such an edge or corner.

Illustrated in FIG. 5 is an exploded, inverted perspective view of the embodiment illustrated in FIG. 4 showing a plurality of inserts but only one of the female members for the sake of simplicity. As indicated above, the female member 3 has external concave lateral surfaces 21 and rounded, convex edges 14. The interior surfaces 37 of the female member 3 are generally parallel to the external configuration of the female member and provide arcuate zones of tangential contact, as indicated generally at 24. When the joint is assembled, an insert 2 and female member 3 make contact in these zones, facilitating assembly. These interior zones of contact also assist in the rotational alignment of a female member 3 in relation to the hub 1, an insert 2, and a setscrew 6.

Certain of the inserts 2 of the second embodiment take a generally cruciform shape as illustrated in FIG. 5. In the interest of clarity, only one of the cruciform inserts will be described, it being understoood that the remaining cruciform insert is identical to the one described.

With reference to FIG. 5, key means or alignment surfaces 26 on the cruciform inserts 2' are formed of planar surfaces which define the radially outermost lateral surfaces of the legs of the cruciform and tangentially contact the arcuate zones 24 when the insert 2' is inserted within the interior 12 of the female member 3. This relatively snug tangential contact allows an individual, even if unskilled in the mechanical arts, to easily and properly orient the female member 3 about the longitudinal axis of the insert 2' in order to orient the setscrew 6 disposed in the threaded aperture 16 with respect to the access opening 5 so that the setscrew can engage the inner, edge portion 10 of the peripheral wall bounding the access opening. This tangential contact also facilitates the smooth, coextensive relation between the surfaces 21 and 22 and 13 and 14, illustrated in FIG. 4. The axial orientation of the setscrew 6 with the access opening 5 is further accomplished as mentioned earlier by abutment of the end of the female member 3 with the abutment surface 4 of the hub 1.

The cruciform cross-section of the inserts 2 may provide enhanced strength and rigidity. In addition, the fillets 28 by reinforcing the junction between the insert 2 and the hub 1 may improve resistance of the joint to destructive loading forces.

The area surroundng the threaded aperture 16 has been reinforced by bosses 29. It will be further noted that the edges of the legs of the cruciform inserts 2' have been rounded at the end 15 thereof as indicated generally by 30 to ensure that the insert 2 can easily be inserted within the female member 3 in spite of small obstructions, such as flashings or burrs.

If not cruciform in transverse section, the inserts 2 of the embodiment of the invention illustrated in FIG. 5 may be cylindrical in transverse section. The cylindrical insert 2'' shown in FIG. 5 can be seen to include roughly conical key means or alignment fillets 31 disposed at the intersection 33 of the cylindrical insert 2'' and its associated abutment surface 4. These alignment fillets 31 fit within the alignment corners 25 of the female member 3 when the cylindrical insert 2'' and associated setscrew 6 are inserted within the interior 12 of the female member 3 and facilitate rotational alignment of the female member 3 about the longitudinal axis of the cylindrial insert 2''. As indicated earlier, orientation of the access opening 5 relative to the setscrew 6 is facilitated by abutment of the end 9 of the female member 3 with the abutment surface 4 of the hub 1. Thus, the conical surface 7 of the setscrew may be easily and properly oriented to cammingly engage the inner, edge portion 10 of the peripheral wall bounding the access opening 5.

The cylindrical insert 2'' shown in FIG. 5 also has two pairs of threaded apertures 16 thereon to improve versatility in orienting the female member 3. The utilization of four threaded apertures 16 enhances the versatility of the joint by allowing the setscrew 6 to be predisposed in any of the four directions in which the access opening 5 might conceivably be oriented.

The cylindrical insert 2 is hollow throughout its length and into the interior of the hub 1, in order that the interior of the hub may be properly cooled to facilitate casting.

FIG. 6 is a transverse sectional view of the joint taken along line 6—6 of FIG. 5 and showing a cylindrical male member assembled with a female member. The joint is shown in a locked condition. It will be noted that the alignment fillets 31 fit generally within a portion of the alignment corners 25 to rotationally orient the female member 3 about the longitudinal axis of the cylindrical insert 2'', so that the axis of the setscrew 6 appears to coincide in this view with the axis of the access opening 5. In this regard, it should be noted that the axis of the setscrew 6 does not coincide with the axis of the access opening 5 as may be seen in FIG. 2.

Also illustrated in FIG. 6 is the contact occurring between the cylindrical insert 2'' and the arcuate zones of tangential contact 24 extending longitudinally along the interior surfaces 37 of the female member. The cooperation of the alignment fillets 31, the insert 2'' at the internal zones of contact 24, and the abutting surfaces 4 and 9 illustrated in FIG. 5 should allow an individual having less than exceptional dexterity to quickly, easily, and accurately orient the access opening 5 relative to the setscrew 6.

Internal bosses 35 restrict the interior of the cylindrical insert 2'' to an essentially rectangular configuration 36 in the area of the threaded apertures 16 and reinforce these apertures. For reasons of economy of manufacture, the four bosses 35 as shown in FIG. 6, which define the generally rectangular configuration 36 within the interior of the insert, extend from the area of the threaded apertures 16 into the interior of the hub 1.

FIG. 7 is a transverse sectional view of the assembled joint taken along line 7—7 of FIG. 5 and showing a cruciform male member assembled with a female member. The joint is shown in a locked condition. The female member 3 is properly oriented about the longitudinal axis of the insert 2' and thus the access opening 5 is properly oriented relative to setscrew 6 as a result of aligning contact between the alignment surfaces 26 of the insert 2' and the zones of contact 24 of the interior surfaces 37 of the female member 3. The contact surfaces 24, the alignment surfaces 26, and the abutting surfaces 4 and 9, illustrated in FIG. 5, cooperate to provide proper alignment of the setscrew 6 relative to the access opening 5. The conical surface 7 of the setscrew 6 can thus cammingly engage the inner edge portion 10 of the peripheral wall bounding the access opening 5 as illustrated in FIG. 3 to cam and rigidly lock the female member 3 together with the members being joined.

SUMMARY OF ADVANTAGES

It will be appreciated that in providing a joint for connecting members according to the present invention certain significant advantages are obtained.

In particular, the unique outward movement and camming engagement of the concealed setscrew with the female member to rigidly lock together members being joined provides the advantage of a very tightly secured and sound joint without the mechanically complex or exposed locking mechanism encountered in the prior art.

Also quite important is the advantage provided by a structural joint capable of resisting under cyclic loading the tendency to loosen and to allow relative movement between the members joined.

A further advantage resides in the fact that the disclosed joint is relatively unsusceptible to residual or concentrated stresses of magnitudes sufficient to reduce the supportive capacity of the joint or to precipitate fracturing.

A further significant advantage resides in the provision of a locking mechanism in a structural joint which is essentially concealed and relatively vandal-proof. Furthermore, the locking mechanism is concealed in such a way as to minimize snagging of objects contacting the joint.

Of independent significance is the fact that the joint provided enjoys the advantage that one individual, having less than exceptional dexterity, employing a single inexpensive tool, such as an allen wrench or screw driver, can quickly and conveniently assemble a structure using the joints.

By reason of the multitude of joints of different geometry which can be formed embodying the concepts described, the joint provided is extremely versatile and can be employed to form a great variety of different frames, racks and similar structures.

Finally, the joint provided is possessed of the advantage that it is quite inexpensive not only to manufacture, but by reason of its versatility, simplicity and convenience of assembly, it is also quite inexpensive to use.

In describing the invention, reference has been made to a preferred embodiment. However, those skilled in the art and familar with the disclosure of the invention may recognize additions, deletions, substitutions, or other modifications which would fall within the purview of the invention as defined in the claims.

What is claimed is:

1. A joint for connecting members comprising:
   a member having a male portion;
   female member means for receiving said male portion;
   camming means operably associated with an inner portion of said female member means; and
   engagement means disposed in said male portion, and movable outwardly from a longitudnal axis of said male portion for engaging said camming means to urge said female member means longitudinally of said male portion and to rigidly lock said female member and said male portion together.

2. A joint for connecting members as defined in claim 1 and further comprising:
   access means disposed in said female member means for providing access to said engagement means to permit manipulation thereof after said female member means receives said male member, said access means including an inner portion engageable by said engagement means and said camming means comprising said inner portion.

3. A joint for connecting members as defined in claim 2 and further comprising:
   abutment means carried by said male portion for receiving an end of said female member means in locked relation therewith when said engagement means is moved into contact with said camming means and said female member means is urged longitudinally of said male portion.

4. A joint for connecting members as defined in claim 3 and further comprising:
   orienting means associated with said male portion for axially and rotationally positioning said camming means with respect to said engagement means.

5. A joint for connecting members as defined in claim 4 wherein said orienting means is comprised of:
   said abutment means operable to axially position said access means with respect to said engagement means;
   key means associated with said male portion for engagement with an interior portion of said female member means to rotationally position said access means with respect to said engagement means.

6. A joint for connecting members as defined in claim 5:
   wherein said camming means is comprised of an inner edge portion of said access means;
   wherein said engagement means is oriented essentially perpendicularly to said longitudinal axis of said male portion;
   wherein said engagement means is continuously disposed in said male portion; and
   wherein said camming means is further comprised of a generally conical surface carried by said engagement means for engaging said inner edge portion of said access means to lock said female member means to said male portion.

7. A joint for connecting members as defined in claim 2:
   wherein said engagement means is continuously disposed in said male portion when said male portion is inserted in said female member means; and
   wherein said engagement means is continuously disposed within the ambit of an outer surface of said female member means after said female member means receives said male portion.

8. A joint for connecting members as defined in claim 7 further comprising:
   abutment means associated with said male portion for axially positioning said camming means with respect to said engagement means; and
   key means associated with said male portion for engagement with interior portions of said female member means to rotationally position said camming means with respect to said engagement means.

9. A joint for connecting members comprising:
   a female member;
   a hub member having a male portion for operable insertion into at least a portion of said female member;
   orienting means disposed on said male portion for orienting said female member relative to said engagement means;
   abutment means comprising a portion of said hub member for abutting said female member to limit the longitudinal extent to which said male portion may be inserted within said female member;
   camming engagement means carried by said male portion and moveable outwardly from a longitudinal axis of said male portion for engaging an inner portion of said female member; and
   access means disposed in said female member through which said engagement means is manipulatable outwardly from said longitudinal axis when said female member and said male portions are united to cammingly engage said engageable inner portion to rigidly lock said female member against said abutment means and against said male portion.

10. A joint for connecting members comprising:
    a female member having an interior surface, an inner engagement surface associated with said interior surface, and an exterior surface;
    a hub member having at least one male portion operably insertable into at least a portion of said female member;
    engaging means carried by said male portion and moveable outwardly from a longitudinal axis of said male portion, said engaging means comprising a conical engaging head for cammingly engaging said inner engagement surface of said female member;

key means disposed on said male portion for engaging said interior surface of said female member to rotationally orient said inner engagement surface relative to said engaging means;

abutting means adjacent said hub member for abutting said female member to axially orient said inner engagement surface relative to said engaging means; and access means disposed in each of said female member means through which said engaging means is manipulatable outwardly from said longitudinal axis to cammingly engage said engagement surface of said female member to rigidly lock said female member against said abutting means and against said male portion, said engaging means being entirely confined within the ambit of said exterior surface of said female member when said joint is locked.

11. A joint for connecting members comprising:

a female member having an access opening and an outer surface;

a hub member having a male portion operably insertable into said female member;

first orienting means associated with hub member for rotationally orienting an inner edge portion of said access opening relative to said male portion;

second orienting means associated with said hub member for abutting and stopping said female member to axially orient said inner edge portion of said access opening relative to said male portion; and eccentric locking means operably disposed in said male portion at a position slightly more longitudinally proximal to said hub member than said access opening when said male portion has been fully inserted into said female member, said eccentric locking means comprising an engagement head moveable outwardly from a longitudinal axis of said male portion to engage said inner edge portion of said access opening to rigidly lock said female member against said hub member and against said male portion, said eccentric locking means being continuously confined within the ambit of said outer surface of said female member when said joint is locked.

* * * * *